United States Patent
Slack et al.

(10) Patent No.: US 7,553,963 B2
(45) Date of Patent: Jun. 30, 2009

(54) LIQUID PARTIALLY TRIMERIZED AND ALLOPHANIZED POLYISOCYANATES BASED ON TOLUENE DIISOCYANATE AND DIPHENYLMETHANE DIISOCYANATE

(75) Inventors: William E. Slack, Moundsville, WV (US); Hersel T. Kemp, II, New Martinsville, WV (US)

(73) Assignee: Bayer MaterialScience LLC, Pittsburgh, PA (US)

( * ) Notice: Subject to any disclaimer, the term of this patent is extended or adjusted under 35 U.S.C. 154(b) by 970 days.

(21) Appl. No.: 10/696,458

(22) Filed: Oct. 29, 2003

(65) Prior Publication Data

US 2005/0096449 A1    May 5, 2005

(51) Int. Cl.
  *C07D 251/34*    (2006.01)
  *C07C 273/00*    (2006.01)
  *C07C 275/60*    (2006.01)
  *C08G 18/79*    (2006.01)

(52) U.S. Cl. ............... 544/193; 252/182.2; 252/182.21; 528/67; 528/73; 544/67; 544/222; 560/336; 560/359; 560/360; 564/44; 564/45

(58) Field of Classification Search ............... 528/67, 528/73; 544/67, 193, 222; 560/336, 359, 560/360; 564/44, 45; 252/182.2, 182.21
See application file for complete search history.

(56) References Cited

U.S. PATENT DOCUMENTS

| | | | |
|---|---|---|---|
| 4,284,730 A | 8/1981 | Narayan et al. | 521/160 |
| 4,326,043 A | 4/1982 | Narayan et al. | 521/137 |
| 4,359,541 A | 11/1982 | Patton, Jr. et al. | 521/137 |
| 4,359,550 A | 11/1982 | Narayan et al. | 524/871 |
| 4,379,905 A | 4/1983 | Stemmler et al. | 528/73 |
| 4,382,125 A | 5/1983 | Narayan et al. | 521/160 |
| 4,456,709 A | 6/1984 | Richter et al. | 521/160 |
| 4,518,761 A | 5/1985 | Richter et al. | 528/67 |
| 4,552,902 A | 11/1985 | Nafziger et al. | 521/129 |
| 4,743,627 A | 5/1988 | Narayan et al. | 521/160 |
| 5,102,918 A | 4/1992 | Moriya | 521/110 |
| 5,124,370 A | 6/1992 | Scholl et al. | 521/161 |
| 5,468,833 A * | 11/1995 | Schwindt et al. | 528/67 |
| 5,491,252 A * | 2/1996 | Narayan et al. | 560/26 |
| 5,723,564 A | 3/1998 | Schmalstieg et al. | 528/73 |
| 5,798,431 A | 8/1998 | Brahm et al. | 528/73 |
| 6,028,158 A | 2/2000 | Slack et al. | 528/44 |
| 6,063,891 A | 5/2000 | Slack et al. | 528/59 |
| 6,262,139 B1 * | 7/2001 | Narayan et al. | 521/159 |
| 6,515,125 B1 | 2/2003 | Slack et al. | 544/222 |

FOREIGN PATENT DOCUMENTS

| | | |
|---|---|---|
| CA | 2113890 | 8/1994 |
| GB | 1 337 659 | 11/1973 |

OTHER PUBLICATIONS

Oertel; Polyurethane Handbook, Chemistry—Raw Materials—Processing—Application—Properties, Second Edition; Hanser Publishers; New York; 1994; p. 90.*

* cited by examiner

*Primary Examiner*—Rabon Sergent
(74) *Attorney, Agent, or Firm*—Lyndanne M. Whalen; Noland J. Cheung

(57) ABSTRACT

This invention relates to storage-stable, liquid, partially trimerized and allophanized polyisocyanates having an NCO group content of 15 to 41% by weight, and comprising 5 to 85% by weight of toluene diisocyanate, 5 to 85% by weight of a polyisocyanate of the diphenyl-methane series and an organic compound or mixture thereof. The present invention also relates to a process for the preparation of the storage-stable, liquid, partially trimerized and allophanized polyisocyanates; to storage-stable, liquid urethane prepolymers of these partially trimerized and allophanized polyisocyanates; and to a process for the production of these storage-stable, liquid, urethane prepolymers.

6 Claims, No Drawings

LIQUID PARTIALLY TRIMERIZED AND ALLOPHANIZED POLYISOCYANATES BASED ON TOLUENE DIISOCYANATE AND DIPHENYLMETHANE DIISOCYANATE

FIELD OF THE INVENTION

The present invention relates to liquid, partially trimerized and allophanized polyisocyanate compositions and to processes for the production thereof. Liquid polyisocyanate products according to the present invention have an NCO group content of from 15 to 41% by weight, and include the partial trimerization and allophanation product of: (A) 5 to 85% by weight of toluene diisocyanate, (B) 5 to 85% by weight of a polyisocyanate of the diphenylmethane series and (C) from 0.1 to 10% by weight of an organic compound or mixture thereof, with the sum of the %'s by weight of (A), (B) and (C) totaling 100% by weight. The present invention also relates to a storage-stable liquid prepolymer of partially trimerized and allophanized polyisocyanate compositions having a NCO content of 8 to 39% by weight.

The trimerization of aromatic isocyanates to form polyisocyanurates is well known in the art. U.S. Pat. Nos. 4,743,627 and 4,382,125 both describe the partial trimerization of polymethylene polyphenylene polyisocyanate (p-MDI), having an average functionality of >2.2, to give stable liquid products having relatively high viscosity at 25° C. (i.e., 2000-100,000 mPa·s).

U.S. Pat. No. 4,284,730 relates to the trimerization of monomeric MDI which has been partially converted to carbodiimide/uretonimine, to give stable liquid polyisocyanurate compositions.

U.S. Pat. No. 5,124,370 describes liquid polyisocyanate mixtures containing isocyanurate groups and having an NCO content of 15 to 30% by weight. These mixtures are obtained by partial trimerization of the isocyanate groups of polyisocyanate mixtures of the diphenylmethane series containing 80 to 100% by weight diisocyanate diphenylmethane isomers and 0 to 20% by weight higher ring compounds of the diisocyanate diphenylmethane series.

The trimerization of toluene diisocyanate in a solvent to make a storage stable liquid is described in both U.S. Pat. No. 4,379,905 and DE 19,523,657. These products are disclosed as being suitable as isocyanate components in two-component polyurethane lacquers.

In accordance with the disclosures of U.S. Pat. No. 4,379,905 and DE 19,523,657, it is necessary that a solvent be present in order to form liquid products. Due to the large quantity of solvent present, these products have restricted uses. In particular, these products are clearly designed for use in coatings applications only.

U.S. Pat. No. 4,456,709 describes storage-stable liquid polyisocyanates which have an NCO group content of 36.5 to 45%. These are prepared by mixing 25 to 70 parts of partially trimerized 2,4-TDI with 75 to 30 parts of unmodified 2,4- and/or 2,6-TDI.

Canadian Patent Application 2,113,890 relates to trimer catalyst systems for aliphatic and aromatic isocyanates. The trimer catalyst systems of this earlier application comprise (A) a lithium compound selected from the group consisting of: (i) lithium salts of aliphatic or aromatic monocarboxylic or dicarboxylic acids, (ii) lithium salts of hydroxyl group containing compounds having from 1 to 3 hydroxyl groups per compound, wherein the hydroxyl groups are directly attached to an aromatic ring, and (iii) lithium hydroxide; and (B) an organic compound containing at least one hydroxyl group. These trimer catalyst systems result in partially trimerized isocyanates which additionally can contain a significant amount of urethane groups.

U.S. Pat. Nos. 6,028,158 and 6,063,891 disclose freeze-stable, allophanate-modified toluene diisocyanurates having an NCO group content of about 15 to about 42%. These freeze-stable compositions are prepared by reacting A) toluene diisocyanate, and B) an organic compound containing at least one hydroxyl group, in the presence of a catalytic amount of C) at least one allophanate-trimer catalyst, or an allophanate-trimer catalyst system. These compositions contain both isocyanurate groups and allophanate groups. Also, this patent discloses blending the allophanate-modified toluene diisocyanurates with poly-methylene poly(phenylisocyanates) (i.e. PMDI), wherein the blend has an NCO content of about 16.8 to 41.6%; and urethane prepolymers of these allophanate-modified toluene diisocyanurates, as well as the blends of these with PMDI, which have NCO group contents of from about 14 to about 40%.

U.S. Pat. No. 4,518,761 discloses a process for the preparation of mixed trimers by at least partially trimerizing the isocyanate groups of two isocyanate components with different reactivities (with respect to trimerization) in the presence of a trimerization catalyst, and mixed trimers prepared by this process. The process comprises (a) adding a less reactive isocyanate component to a vessel, (b) trimerizing at least about 0.1% of the isocyanate groups of the less reactive isocyanate component in the presence of a trimerization catalyst, (c) metering the more reactive isocyanate component into the reaction vessel, and optionally, (d) terminating the trimerization reaction at the desired degree of trimerization by thermal decomposition of the trimer catalyst and/or adding a catalyst stopper/poison. It is essential according to the '761 patent, that the two isocyanate components have different reactivities. Thus, it is possible to use an isocyanate having aliphatically bound and/or cycloaliphatically bound isocyanate groups with an isocyanate having aromatically bound isocyanate groups; or to use an isocyanate having aliphatically or cycloaliphatically bound isocyanate groups with an isocyanate having heteroaromatically bound isocyanates groups; etc. Since aliphatic isocyanates give liquid trimer products, this approach allows for the incorporation of an aromatic isocyanate into a trimer product that could be a liquid. It is not, however, disclosed or suggested by U.S. Pat. No. 4,518,761 that two different aromatic isocyanate components can be used to form a liquid product.

U.S. Pat. No. 5,798,431 describes a process for the production of polyisocyanates containing isocyanurate groups by catalytically trimerizing a mixture of a) a low molecular weight isocyanate component having aliphatically bound isocyanate groups, an average molecular weight of 128 to 800 and an average NCO functionality of 1.7 to 2.2, and b) a low molecular weight isocyanate component having an aromatically bound isocyanate groups, an average molecular weight of 148 to 800 and an average NCO functionality of 1.7 to 2.2, in the presence of c) an aminosilyl compound. Any excess distillable isocyanate is subsequently removed to form a polyisocyanate having a monomer content of less than 0.7%, based on the weight of polyisocyanate solids. The examples are directed to toluene diisocyanate and hexamethylene diisocyanate.

U.S. Pat. No. 5,102,918 describes a process for producing a modified organic polyisocyanate having an isocyanurate ring. This process comprises adding a trimerization catalyst, an organic phosphite ester and a surfactant (and optionally a ferrocene compound) to an organic polyisocyanate and/or a partially urethanized organic polyisocyanate to form isocyanurate groups of not more than 20% of the total of isocyanate groups. A stopper is added, if necessary. Suitable organic polyisocyanates include both TDI and MDI. Example 18 appears to use MDI and TDI.

U.S. Pat. No. 6,515,125 discloses a storage-stable, liquid, partially trimerized polyisocyanate having an NCO group content of 24 to 40% by weight containing 20 to 88% by weight of TDI and 12 to 80% by weight of MDI.

Carbodiimide and/or uretonimine-isocyanurate-containing polyisocyanates are described by U.S. Pat. No. 4,284,730. These can be prepared by (a) partial trimerization of a mixture of a polyisocyanate and a polyisocyanate-uretonimine with trimer catalysts to the desired free isocyanate level, (b) sequential partial carbodiimidization to uretonimine followed by partial trimerization of a polyisocyanate, (c) sequential trimerization of the polyisocyanate followed by partial carbodiimidization, (d) simultaneous conversion using a mixed catalyst system of carbo-diimide and isocyanurate catalysts, (e) blending liquid polyisocyanate with a polyisocyanate-uretonimine mixture and a polyisocyanate-isocyanurate mixture (see column 2, lines 37-50).

U.S. Pat. Nos. 4,326,043, 4,359,541 and 4,359,550 each describes dispersible polyisocyanurate polymers. Suitable isocyanates are disclosed broadly, including mixtures of TDI, MDI and PMDI. This reference also discloses that the isocyanate can be converted to a trimer in a solvent which is a solid, and then dispersed in a polyol. Examples 48-84 of the '043 patent disclose the dispersed trimer solid containing catalysts, surfactants, etc., is reacted with the isocyanate blend of TDI/MDI (80:20) to form a foam.

Stable solutions of trimerized isocyanate prepolymers in monomeric polyisocyanates are described by the U.S. Pat. No. 4,552,902 patent. First an isocyanate-terminated prepolymer is made, then a co-trimer is formed by trimerizing the NCO-terminated prepolymer with MDI or PMDI. The co-trimer is reacted with an excess of a low equivalent weight polyol to form another isocyanate-terminated prepolymer. TDI is suitable for forming the first NCO-terminated prepolymer. The examples all use TDI and MDI, and various polyols to form the prepolymers. It is expressly stated at column 5, lines 50-55, that the diols must be present for the products to be liquids. Also, the first step of making a prepolymer followed by the addition of the second isocyanate, then trimerizing the mixture will result in allophanate formation.

GB 1,337,659 describes a polyisocyanate solution which comprises a solution of at least one polyisocyanate containing at least one isocyanuric acid ring dissolved in a monomeric polyisocyanate which is free from isocyanurate groups. These are not mixed trimers, but rather are a TDI trimer mixed with a TDI prepolymer. Only Example 5 describes the preparation of a mixed trimer product from MDI and TDI with 1,2-propylene glycol. However, this product contains less than 3% by weight of trimer, and there is no evidence that it would be a stable liquid product.

Partial trimerization of TDI always leads to a product that forms solids on storage at 25° C. Partial trimerization of MDI containing >80% by weight of 4,4'-MDI will also always form solids at 25° C. The current invention allows for the preparation of partial trimerization products which are solid-free liquids at 25° C., by the partial trimerization and allophanation of a reactive mixture of TDI, MDI and an organic compound or mixture thereof. The present invention also allows the preparation of stable products with either low TDI or low MDI.

SUMMARY OF THE INVENTION

This invention relates to storage-stable liquid, partially trimerized and allophanized polyisocyanate compositions. These storage-stable liquid, partially trimerized and allophanized polyisocyanates have an NCO group content of 15 to 41% by weight, or, for example, 17 to 39% by weight, or, further for example, of 19 to 37% by weight. The liquid polyisocyanates of the present invention comprise the partial trimerization and allophanation product of:

(A) from 5 to 85% by weight of toluene diisocyanate having an isomer distribution of:
  (1) from 60 to 100% by weight of the 2,4-isomer, and
  (2) from 0 to 40% by weight of the 2,6-isomer, with the sum of the %'s by weight of (A)(1) and (A)(2) totalling 100% by weight of (A);
and
(B) from 5 to 85% by weight of a polyisocyanate of the diphenylmethane series comprising from:
  (1) 0 to 50% by weight of higher functionality polyisocyanates of the diphenylmethane series,
  (2) 40 to 100% by weight of 4,4'-diphenylmethane diisocyanate,
  (3) 0 to 20% by weight of 2,4'-diphenylmethane diisocyanate,
  and
  (4) 0 to 6% by weight of 2,2'-diphenylmethane diisocyanate,
  with the sum of the %'s by weight of (B)(1), (B)(2), (B)(3) and (B)(4) totalling 100% by weight of (B);
and
(C) from 0.1 to 10% by weight of an organic compound or mixture thereof containing from 1 to 4 hydroxyl groups capable of reacting with NCO groups and having a molecular weight of from 32 to 6000 wherein the sum of the %'s by weight of (A), (B) and (C) total 100% by weight.

The present invention also relates to a process for the preparation of these storage-stable, liquid polyisocyanate compositions having an NCO group content of 15 to 41%, or, for example, 17 to 39%, or, further for example, of 19 to 37%. This process includes:

(1) reacting:
(A) from 5 to 85% by weight of toluene diisocyanate having an isomer distribution of:
  (1) from 60 to 100% by weight of the 2,4-isomer, and
  (2) from 0 to 40% by weight of the 2,6-isomer, with the sum of the %'s by weight of (A)(1) and (A)(2) totaling 100% by weight of (A);
and
(B) from 5 to 85% by weight of a polyisocyanate of the diphenylmethane series comprising from:
  (1) 0 to 50% by weight of higher functionality polyisocyanates of the diphenylmethane series,
  (2) 40 to 100% by weight of 4,4'-diphenylmethane diisocyanate,
  (3) 0 to 20% by weight of 2,4'-diphenylmethane diisocyanate,
  and
  (4) 0 to 6% by weight of 2,2'-diphenylmethane diisocyanate,
  with the sum of the %'s by weight of (B)(1), (B)(2), (B)(3) and (B)(4) totaling 100% by weight of (B);

and (C) from 0.1 to 10% by weight of an organic compound or mixture thereof containing from 1 to 4 hydroxyl groups capable of reacting with NCO groups and having a molecular weight of from 32 to 6000 wherein the sum of the %'s by weight of (A), (B) and (C) total 100% by weight.

in the presence of:

(D) at least one trimerization catalyst and optionally an allophanation catalyst, followed by the addition of:

(E) an acidic stopper.

The present invention also relates to storage-stable, liquid prepolymers containing the mixed trimers and allophanates described above. These storage-stable, liquid prepolymers contain a mixed trimer and allophanate of toluene diisocyanate, a polyisocyanate of the diphenylmethane series and an organic compound, and have an NCO group content of 8 to 39%. These prepolymers contain the reaction product of:

(I) the liquid, partially trimerized and allophanized polyisocyanates having an NCO group content of 15 to 41%, and which contain the partial trimerization and allophanation product of:

(A) from 5 to 85% by weight of toluene diisocyanate having an isomer distribution of:
(1) from 60 to 100% by weight of the 2,4-isomer, and
(2) from 0 to 40% by weight of the 2,6-isomer, with the sum of the %'s by weight of (A)(1) and (A)(2) totaling 100% by weight of (A);

and (B) from 5 to 85% by weight of a polyisocyanate of the diphenylmethane series comprising from:
(1) 0 to 50% by weight of higher functionality polyisocyanates of the diphenylmethane series,
(2) 40 to 100% by weight of 4,4'-diphenylmethane diisocyanate,
(3) 0 to 20% by weight of 2,4'-diphenylmethane diisocyanate,
and
(4) 0 to 6% by weight of 2,2'-diphenylmethane diisocyanate,
with the sum of the %'s by weight of (B)(1), (B)(2), (B)(3) and (B)(4) totaling 100% by weight of (B);

and (C) from 0.1 to 10% by weight of an organic compound or mixture thereof containing from 1 to 4 hydroxyl groups capable of reacting with NCO groups and having a molecular weight of from 32 to 6000;

wherein the sum of the %'s by weight of (A), (B) and (C) total 100% by weight.

and (II) an organic component containing from 1.5 to 4 hydroxyl groups, or for example 1.8 to 3 hydroxyl groups, and having a molecular weight of 76 to 6,000, or, for example, of 76 to 4,800.

The present invention also relates to a process for the production of these storage-stable, liquid prepolymers containing a mixed trimer and allophanate of toluene diisocyanate and a polyisocyanate of the diphenylmethane series and having an NCO group content of 8 to 39%.

This process comprises:

(1) reacting (I) the liquid, partially trimerized and allophanized polyisocyanates having an NCO group content of 15 to 41% by weight, or, for example, of 17 to 39% by weight, or, further for example, of 15 to 37% by weight, and which comprise the partial trimerization and allophanation reaction product of:

(A) from 5 to 85% by weight of toluene diisocyanate having an isomer distribution of:
(1) from 60 to 100% by weight of the 2,4-isomer, and
(2) from 0 to 40% by weight of the 2,6-isomer, with the sum of the %'s by weight of (A)(1) and (A)(2) totaling 100% by weight of (A);

and (B) from 5 to 85% by weight of a polyisocyanate of the diphenylmethane series comprising from:
(1) 0 to 50% by weight of higher functionality polyisocyanates of the diphenylmethane series,
(2) 40 to 100% by weight of 4,4'-diphenylmethane diisocyanate,
(3) 0 to 20% by weight of 2,4'-diphenylmethane diisocyanate,
and
(4) 0 to 6% by weight of 2,2'-diphenylmethane diisocyanate,
with the sum of the %'s by weight of (B)(1), (B)(2), (B)(3) and (B)(4) totaling 100% by weight of (B);

and (C) from 0.1 to 10% by weight of an organic compound or mixture thereof containing from 1 to 4 hydroxyl groups capable of reacting with NCO groups and having a molecular weight of from 32 to 6000;

wherein the sum of the %'s by weight of (A), (B) and (C) total 100% by weight.

with (II) an organic component containing from 1.5 to 4 hydroxyl groups, or, for example, from 1.8 to 3 hydroxyl groups, and having a molecular weight of from 76 to 6,000, or, for example, from 76 to 4,800.

DETAILED DESCRIPTION OF THE INVENTION

The present invention will now be described for purposes of illustration and not limitation. Except in the operating examples, or where otherwise indicated, all numbers expressing quantities, percentages, OH numbers, functionalities and so forth in the specification are to be understood as being modified in all instances by the term "about." Also, all ranges include any combination of the maximum and minimum points disclosed and include any intermediate ranges therein, which may or may not be specifically enumerated herein.

In accordance with the present invention, the term "liquid" means that the partially trimerized product does not precipitate solids when stored at 25° C. for 3 months; and the term "storage-stable" means that the partially trimerized and allophanized product has up to a 1% absolute change in the % NCO group content and up to a 10% change in the viscosity when stored at 25° C. for 3 months.

The liquid, partially trimerized and allophanized polyisocyanates of the present invention include:

(A) from 5 to 85% by weight, or, for example, from 10 to 80%, or, further for example, from 15 to 70%, of toluene diisocyanate;

(B) from 5 to 85% by weight, or, for example, from 10 to 75%, or, further for example, from 15 to 65%, of a polyisocyanate of the diphenylmethane series, and (C) from 0.1 to 10% by weight of an organic compound or mixture thereof, or for example from 2 to 6% by weight, or further for example from 3 to 5% by weight.

wherein the sum of the %'s by weight of (A), (B) and (C) totals 100% by weight of the polyisocyanate composition.

These storage-stable, liquid partially trimerized and allophanized polyisocyanates have an NCO group content of 15 to 41% by weight, or, for example, of 17 to 39% by weight, or, further for example, of 15 to 37% by weight. According to the present invention, at least 50% of the urethane groups are converted to the allophanate.

Toluene diisocyanate (A) used in the present invention can have an isomer distribution of (1) from 60 to 100% by weight, or for example from 65 to 90%, or further for example from 65 to 80% of the 2,4-isomer; and (2) from 0 to 40% by weight, or for example from 10 to 35%, or further for example from 20 to 35% of the 2,6-isomer; wherein the sum of the %'s by weight of (A)(1) and (A)(2) totals 100% by weight of (A).

Suitable polyisocyanates of the diphenylmethane series that can be used as (B) in the present invention includes:
(1) from 0 to 50%, or, for example, from 0 to 40%, or, further for example, from 0 to 30% by weight of higher functionality polyisocyanates of the diphenylmethane series;
(2) from 40 to 100%, or, for example, from 45 to 100%, or, further for example, from 59 to 100% by weight of 4,4'-diphenylmethane diisocyanate;
(3) from 0 to 20%, or, for example, from 1 to 15%, or, further for example, from 2 to 10% by weight of 2,4'-diphenylmethane diisocyanate;
and
(4) from 0 to 6%, or, for example, from 0 to 3%, or, further for example, from 0 to 1% by weight of 2,2'-diphenylmethane diisocyanate;

wherein the sum of the %'s by weight of (B)(1), (B)(2), (B)(3) and (B)(4) totals 100% by weight of (B).

Suitable as organic compounds or mixtures thereof that can be used as (C) contain from 1 to 4 hydroxyl groups capable of reacting with NCO groups and have a molecular weight of from 32 to 6000. (C) can be an aliphatic alcohol having from 1 to 16 carbon atoms or an aromatic alcohol having from 5 to 20 carbon atoms.

Suitable organic compounds include, for example, at least one of, methanol, ethanol, 1,2-ethanediol, 1-propanol, 2-propanol, 1-butanol, isobutyl alcohol, 2-butanol, n-amyl alcohol, sec-amyl alcohol, tert-amyl alcohol, 1-ethyl-1-propanol, n-hexanol and isomers thereof, n-octyl alcohol, 2-octyl alcohol, 2-ethyl-1-hexanol, n-decyl alcohol, n-dodecyl alcohol, neopentylglycol, n-tetradecyl alcohol, n-hexadecyl alcohol, n-octadecyl alcohol, 1,2 and 1,3-propanediol, 1,4-butanediol, 1,3-butanediol, 2,3-butanediol, 3-methyl-2-butanol, 3,3-dimethyl-1-butanol, 2-ethyl-1,3-hexanediol, glycerol, 1,2,4-butanetriol, pentaerythritol, diethylene glycol, dipropylene glycol, diethylene glycol, triethylene glycol, etc. Further, these organic compounds can contain from 1 to 2 hydroxyl groups, such as a monoalcohol or a diol, and have a molecular weight of from 60 to 200. Examples include, at least one of 1-propanol, 2-propanol, 1-butanol, 2-butanol, n-amyl alcohol, 1-methylbutyl alcohol, 1-ethyl-1-propanol, n-octyl alcohol, 2-octyl alcohol, 2-ethyl-1-hexanol, neopentyl-glycol, 1,2-propanediol, 1,3-propanediol, 1,4-butanediol, 1,3-butanediol, 2,3-butanediol, 2-ethyl-1,3-hexanediol, diethylene glycol, triethylene glycol, dipropylene glycol, tripropylene glycol, etc. Further, for example suitable compounds include isomeric alcohols having between 2 and 16 carbon atoms such as, for example, the isomeric butanols, the isomeric propanols and mixtures thereof. Further, for example the compound can be 2-propanol and/or isobutyl alcohol.

Suitable trimerization catalysts for the present invention include catalysts such as, for example, at least one of, substituted guanidines such as, for example, tetramethyl guanidine, Mannich bases such as, for example, 2,4,6-bis(dimethylaminoethyl)phenol, and alkali metals salts of carboxylic acids. Any other catalysts known to be effective in trimerization reactions can also be used in the present invention. For example the trimerization catalyst can be methylene-bis(3,3', 5,5'-tetra-dimethylamino-methyl-2,2'-phenol).

Suitable allophanate catalysts, for the present invention include, for example, at least one of metal carboxylates and metal acetylacetonates. Some examples of suitable allophanate catalysts for the present invention include zinc octoate, tin-2-ethylhexanoate, zinc acetyl-acetonate, zinc-2-ethylhexanoate, cobalt linoresinate, lead naphthenate, lead 2-ethylhexanoate, lead linoresinate, cobalt 2-ethylhexanoate, cobalt naphthenate, etc. For example, allophanate catalysts can be zinc octoate, tin octoate, zinc-2-ethylhexanoate, tin-2-ethylhexanoate, and zinc acetylacetonate.

Suitable catalysts according to the present invention can also include allophanate-trimer catalysts or allophanate-trimer catalyst systems. Systems typically comprise at least one trimer catalyst and at least one allophanate catalyst. The catalysts can be added in various ratios. For example, according to the present invention the system may contain 2 to 3 parts trimer catalyst to one part allophanate catalyst.

Suitable allophanate-trimer catalysts for the present invention include, for example, any of the known trimerization catalysts which convert at least 50%, preferably at least 70%, more preferably at least 85% and most preferably at least 95% of the equivalents of the urethane groups formed to allophanate groups. Some examples of trimer catalysts which form both trimer groups and allophanate groups include Mannich bases such as, for example, 2,4,6-bis(dimethylamino-methyl) phenol; metal salts of carboxylic acids such as, for example, lead octanoate and potassium acetate.

Examples of useful allophanate-trimer catalyst system for the present invention contain:
(a) at least one trimer catalyst selected from the group consisting of:
  (i) lithium salts of aliphatic or aromatic monocarboxylic acids or dicarboxylic acids,
  (ii) lithium salts of hydroxyl group containing compounds containing from 1 to 3 hydroxyl groups per compound, wherein the hydroxyl groups are attached directly to an aromatic ring,
  (iii) lithium hydroxide,
  and
  (iv) mixtures thereof;
and
(b) at least one allophanate catalyst.

Suitable lithium compounds, for the allophanate-trimer catalyst, for use in the present invention include, for example, both the monolithium and dilithium salts of aliphatic and aromatic carboxylic acids containing a total of from about 1 to 36 carbon atoms. Both the mono- or dicarboxylic acids are suitable for the process according to the invention. Examples of these lithium compounds include lithium formate, lithium salicylate, lithium acetate, lithium stearate, lithium propanate, lithium butyrate, lithium lactate, lithium laurate, lithium benzoate, lithium p-hydroxybenzoate, lithium 4-hydroxyphenylacetate, monolithium salt of oxalic acid, dilithium salt of oxalic acid, monolithium salt of glutaric acid, dilithium salt of glutaric acid, mono-lithium salt of isophthalic acid, dilithium salt of isophthalic acid, monolithium salt of phthalic acid, dilithium salt of phthalic acid, monolithium salt of terephthalic acid, and dilithium salt of terephthalic acid. Of these salts, lithium salicylate, lithium acetate, and lithium stearate are preferred.

The lithium compound may also be, for example, the lithium salt of a hydroxy group containing compound wherein the hydroxyl groups are directly attached to an aromatic ring. These compounds may contain from 1 to 3 hydroxyl groups each, and the aromatic ring system contains a total of from 6 to 18 carbon atoms. The aromatic ring system may be a single ring such as, for example, phenyl, or a polynuclear aromatic system such as, for example, naphthalene. Suitable compounds include, for example, lithium phenoxide, 4-methyl lithium phenoxide, 2-hydroxy lithium phenoxide, 3-hydroxy lithium phenoxide, 4-hydroxy lithium phenoxide, lithium 1-naphthoxide, lithium 2-naphthoxide, etc. Lithium salts of cresols are also suitable trimerization catalysts. Theoretically, the lithium salts of substituted aromatic compounds are suitable provided the substituents do not deactivate the ring so that it is no longer an effective trimerization catalyst.

Lithium hydroxide is suitable for use in the present invention.

Lithium salts of mono- and di-carboxylic acids, are readily obtained using standard preparative methods well known to one skilled in the art. Equation (1) represents a general preparative method.

$$R_1COOH + LiA \rightarrow R_1COO^-Li^+ + AH \qquad (1)$$

wherein:

$R_1$ represents hydrogen or an aliphatic hydrocarbon chain having from 1 to 35 carbon atoms, or an aromatic ring system having from 6 to 18 carbon atoms, and A represents an anion such as hydroxyl, hydride, alkoxide, etc.

The reactant LiA is used in an amount which is slightly less than molar equivalency, thereby ensuring that no residual reactant will remain in the products.

The lithium salts of hydroxyl group containing compounds wherein the hydroxyl groups are directly attached to an aromatic ring, can be prepared by a typical acid base reaction, followed by the distillation of water, methanol, etc. However, the base must be stronger than the anion of the hydroxyl group of the aromatic compound. For example, lithium phenoxide can be prepared by reacting phenol with lithium hydroxide or lithium methoxide.

Suitable carboxylic acids for the preparation of the lithium salts include, for example, those aliphatic carboxylic acids having from about 1 to about 36 carbon atoms, and aromatic carboxylic acids wherein the aromatic ring system has from 6 to 18 carbon atoms. The aliphatic carboxylic acids may be either branched or straight chain, and either saturated or unsaturated. Both aliphatic and aromatic monocarboxylic acids and dicarboxylic acids are suitable. Some examples of these include formic acid, acetic acid, propionic acid, stearic acid, lactic acid, benzoic acid, salicylic acid, lauric acid, glutaric acid, p-hydroxybenzoic acid, phthalic acid, isophthalic acid, and terephthalic acid. Theoretically, any compound having the carboxylic acid group would be suitable provided any additional substituents do not interfere with the formation of the salt.

Hydroxyl group containing compounds having at least one hydroxyl group attached directly to an aromatic ring which are suitable for the preparation of lithium salts include, for example, those aromatic alcohols containing from about 6 to 18 carbon atoms, and containing from 1 to 3 hydroxyl groups present per aromatic ring. Examples of these aromatic compounds include phenol, m-cresol, resorcinol, hydroquinone, catechol, 1-naphthol, 2-naphthol, 4-methoxy-1-naphthol, 1-methoxy-2-naphthol, 1-nitro-2-naphthol, 4-nitro-1-naphthol, 4-chloro-1-naphthol, 1-chloro-2-naphthol, hydroxyanthracene, hydroxyphenanthrene, isomeric methoxyphenols, nitrophenols, chlorophenols, etc.

Suitable acidic stoppers for the present invention include compounds such as, for example, at least one of benzoyl chloride, anhydrous hydrochloric acid, sulfuric acid, bis(2-ethylhexyl) hydrogen phosphate, Lewis acids, etc. Further for example, stoppers include benzoyl chloride and bis(2-ethylhexyl)hydrogen phosphate.

Suitable organic compohents (II) used for preparing prepolymers, which contain isocyanate-reactive hydroxyl groups include, for example, those compounds containing 1.5 to 4 hydroxyl groups, or, for example from 1.8 to 3 hydroxyl groups, and having a molecular weight of 76 to 6,000, or, for example, from 76 to 4,800. Some examples of suitable compounds to be used as the organic component in forming the prepolymer are polyether polyols, polyester polyols, and diols.

Polyether polyols suitable for this aspect of the present invention include those having hydroxyl functionalities of from 1.5 to 4, or for example from 1.8 to 3, and molecular weights of from 300 to 6,000, or for example from 800 to 2,000, to yield a urethane prepolymer having an NCO content of from 8 to 39%, or further for example from 12 to 26%. Suitable polyester polyols to be used as the organic component containing isocyanate-reactive groups for this aspect of the present invention includes those compounds having hydroxyl functionalities of 1.8 to 2, for example 2, and molecular weights of 200 to 3,000, or for example from 500 to 2,000 to yield a urethane prepolymer having an NCO group content of from 8 to 39%, further for example from 12 to 26%.

Suitable diols to be used as organic components which contain isocyanate-reactive groups in the formation of urethane prepolymers include compounds such as, for example, at least one of 1,3-butanediol, 1,2 and 1,3-propylene glycol, 2,2,4-trimethyl-1,3-pentanediol, 2-methyl-1,3-propanediol, dipropylene glycol, tripropylene glycol, diethylene glycol and triethylene glycol. Further, for example, suitable diols include at least one of 1,3-butanediol, 1,2 and 1,3-propylene glycol, dipropylene glycol, and tripropylene glycol.

The process 1 of the present invention includes reacting toluene diisocyanate, a specified polyisocyanate of the diphenylmethane series and at least one organic compound at 25 to 50° C., adding a trimerization catalyst and/or allophanation catalyst to this mixture, once the urethane reaction is complete, in an amount of 0.1 to 10% by weight, based on the entire weight of the isocyanate mixture, followed by heating the mixture at temperatures of from 70 to 100° C., or for example from 85 to 95° C., until the desired NCO group content of the reaction mixture is reached, then a catalyst stopper is added. The catalyst stopper can be added in a weight ratio of 1:0.3 to 1:1 trimer catalyst to catalyst stopper and in a weight ratio of 1:0.5 to 1:1 allophanate catalyst to catalyst stopper.

The process 2 of the present invention also includes reacting toluene diisocyanate or a specified polyisocyanate of the diphenylmethane series and at least one organic compound at 25 to 50° C. and when the initial urethane reaction is complete adding a specified polyisocyanate of the diphenylmethane series or toluene diisocyanate and a trimer catalyst and optionally an allophanate catalyst. The reaction mixture can then be heated to about 70 to 100° C. until the desired NCO content is reached. An acid stopper can then be added.

Also, processes of the present invention includes following any of the previously disclosed processes except the reaction is allowed to go between 1 to 10% lower in NCO content and then adding an acid stopper followed by blending the desired NCO content mixture with either a polyisocyanate of the diphenylmethane series prepared from 0 to 50% by weight of higher functionality polyisocyanates of the diphenylmethane series, 30 to 60% by weight of 4,4'-MDI, 3 to 60% by weight of 2,4'-MDI and 0 to 6% by weight of 2,2'-MDI or a uretonimine modified polyisocyanates of the diphenylmethane series prepared from 34 to 100% by weight of 4,4'-MDI, 0 to 60% by weight of 2,4'-MDI and 0 to 6% by weight of 2,2'-MDI.

The process for the preparation of liquid urethane prepolymers having an NCO content of 8 to 39% from a liquid, partially trimerized and allophanized polyisocyanate having an NCO content of 15 to 41% by weight comprises reacting the partially trimerized polyisocyanate with an isocyanate-reactive component containing from 1.5 to 4 hydroxyl groups and having a molecular weight of from 76 to 6,000, or, for example, between 76 and 4,800, at temperatures between 40 and 120° C., or, for example, between 50 and 80° C. for a time of from 0.5 to 4 hours, or, for example, from 1 to 3 hours.

The following examples further illustrate details for the preparation and use of the compositions of this invention. The invention, which is set forth in the foregoing disclosure, is not to be limited either in spirit or scope by these examples. Those skilled in the art will readily understand that known variations of the conditions and processes of the following preparative procedures can be used to prepare these compositions. Unless otherwise noted, all temperatures are degrees Celsius and all parts and percentages are parts by weight and percentages by weight, respectively.

EXAMPLES

The following materials were used in the working examples:
TDI: an isomeric mixture having an NCO content of about 48.27% and comprising 80% by weight 2,4-toluene diisocyanate and 20% by weight 2,6-toluene diisocyanate.
MDI-1: an isomeric mixture, having and NCO content of about 33.6% and comprising 98.4% by weight of 4,4'diphenylmethane diisocyanate and 1.6% by weight 2,4'-diphenylmethane diisocyanate.
MDI-2: an isomeric mixture, having an NCO content of about 33.6% and comprising 45.8% by weight of 4,4'-diphenylmethane diisocyanate, 52.8% by weight of 2,4'-diphenylmethane diisocyanate and 1.4% by weight of 2,2'-diphenylmenthane diisocyanate.
MDI-3: a polyisocyanate having an NCO content of about 28.8% and a functionality of about 2.2 and comprising 72% by weight 4,4'-diphenylmethane diisocyanate, 1% by weight 2,4'-diphenylmethane diisocyanate and 27% by weight of uretonimine of diphenylmethane diisocyanate.
Alcohol A: Isobutyl alcohol
Cat. A: Methylene-bis (3,3', 5,5',-tetra-dimethylaminomethyl-2,2'-phenol)
Cat. B: Zinc Acetylacetonate
Acidic Stopper: Benzoyl Chloride Examples 1-5

The following procedure was followed using the reaction mixtures as listed in Table 1 below. The amount disclosed in Table 1 of TDI, MDI-1 and Alcohol A were added to a reactor vessel at 40° C., then, once the urethane reaction was complete, based on the NCO content, Catalyst A and/or Catalyst A and B were added to the mixture in the amount specified in Table 1. The mixture was then heated to 90° C., until the desired NCO group content of the reaction mixture was reached, then the catalyst stopper was added in the amount specified in Table 1. The desired NCO content appears in Table 1 and can be any NCO content below the theoretical NCO for the allophanate. The percent (%) NCO of the partially trimerized and allophanized isocyanate mixture and viscosity are listed in Table 1. After storage for 3 months at 25° C., the product remained a clear liquid.

TABLE 1

Examples Prepared According to Process 1 at 90° C.

| Example # | Reaction Mixture, pbw | Catalyst, ppm | | Acidic stopper, ppm | % NCO | Visc. @ 25° C., mPa·s | Reaction Time, hr |
|---|---|---|---|---|---|---|---|
| 1 | 52.2 TDI<br>250.0 MDI-1<br>11.1 Alcohol A | 200 | Cat. A | 70 | 27.9 | 153 | 6.5 |
| 2 | 52.2 TDI<br>250.0 MDI-1<br>11.1 Alcohol A | 400<br>100 | Cat. A<br>Cat. B | 230 | 25.8 | 1216 | 1.5 |
| 3 | 45.5 TDI<br>250.0 MDI-1<br>14.6 Alcohol A | 280<br>100 | Cat. A<br>Cat. B | 200 | 26.5 | 232 | 1.0 |
| 4 | 45.5 TDI<br>250.0 MDI-1<br>14.6 Alcohol A | 400<br>100 | Cat. A<br>Cat. B | 230 | 24.4 | 2323 | 1.5 |
| 5 | 34.8 TDI<br>250.0 MDI-1<br>14.8 Alcohol A | 280<br>100 | Cat. A<br>Cat. B | 200 | 25.0 | 624 | 1.5 |

Examples 6-14

The following procedure was followed using the reaction mixtures as listed in Table 2 below. The amount disclosed in Table 2 of TDI and Alcohol A were added to a reactor vessel at 25° C., then, once the urethane reaction was complete, based on the NCO content, MDI-1, MDI-2 and Catalysts A and B were added to the mixture in the amount specified in Table 2. The mixture was then heated to 90° C., until the desired NCO group content of the reaction mixture was reached, the desired NCO content appears in Table 2 and can be any NCO content below the theoretical NCO for the allophanate, then the catalyst stopper was added in the amount specified in Table 2. The percent (%) NCO of the partially trimerized and allophanized isocyanate mixture and viscosity are listed in Table 2. After storage for 3 months at 25° C., the product remained a clear liquid.

TABLE 2

Examples Prepared According to Process 2 at 90° C.

| Example # | Reaction Mixture, pbw | Catalyst, ppm | | Acidic stopper, ppm | % NCO | Visc. @ 25° C., mPa·s | Reaction Time, hr |
|---|---|---|---|---|---|---|---|
| 6 | 26.1 TDI<br>175.0 MDI-1<br>75.0 MDI-2<br>13.9 Alcohol A | 280<br>100 | Cat. A<br>Cat. B | 200 | 25.8 | 265 | 1.5 |
| 7 | 26.1 TDI<br>175.0 MDI-1<br>75.0 MDI-2<br>13.9 Alcohol A | 400<br>100 | Cat. A<br>Cat. B | 230 | 24.0 | 1860 | 1.75 |
| 8 | 52.2 TDI<br>200.0 MDI-1<br>50.0 MDI-2<br>11.1 Alcohol A | 280<br>100 | Cat. A<br>Cat. B | 200 | 28.6 | 95 | 0.75 |
| 9 | 42.0 TDI<br>175.0 MDI-1<br>75.0 MDI-2<br>8.9 Alcohol A | 280<br>100 | Cat. A<br>Cat. B | 200 | 29.1 | 76 | 3.0 |
| 10 | 42.0 TDI<br>175.0 MDI-1<br>75.0 MDI-2<br>8.9 Alcohol A | 400<br>100 | Cat. A<br>Cat. B | 230 | 26.2 | 1080 | 5.75 |
| 11 | 38.8 TDI<br>200.0 MDI-1<br>50.0 MDI-2<br>12.4 Alcohol A | 280<br>100 | Cat. A<br>Cat. B | 200 | 27.2 | 151 | 3.0 |
| 12 | 38.8 TDI<br>200.0 MDI-1<br>50.0 MDI-2<br>12.4 Alcohol A | 375<br>100 | Cat. A<br>Cat. B | 225 | 24.9 | 1555 | 2.0 |
| 13 | 30.0 TDI<br>175.0 MDI-1<br>75.0 MDI-2<br>12.8 Alcohol A | 280<br>100 | Cat. A<br>Cat. B | 200 | 26.6 | 167 | 2.75 |
| 14 | 30.0 TDI<br>175.0 MDI-1<br>75.0 MDI-2<br>12.8 Alcohol A | 380<br>100 | Cat. A<br>Cat. B | 225 | 24.4 | 1868 | 2.5 |

Examples 15-19

The procedure of Examples 6-14 was repeated, using the reaction mixtures as listed in Table 3 below. All the products listed in Table 3 were clear liquids and storage stable at 25° C. for three weeks.

TABLE 3

Examples Prepared According to Process 2 at 90° C.

| Ex. | Reaction mixture, pbw | Catalyst, ppm | | Acidic Stopper, ppm | Concentrate % NCO | Blend isocyanate, pbw | | Final % NCO | Visc. @ 25° C., mPa·s | Reaction Time, hr |
|---|---|---|---|---|---|---|---|---|---|---|
| 15 | 26.1 TDI<br>225 MDI-1<br>13.9 Alcohol A | 280<br>100 | Cat. A<br>Cat. B | 200 | 24.6 | 25 | MDI-2 | 25.3 | 400 | 2.5 |

TABLE 3-continued

Examples Prepared According to Process 2 at 90° C.

| Ex. | Reaction mixture, pbw | Catalyst, ppm | | Acidic Stopper, ppm | Concentrate % NCO | Blend isocyanate, pbw | | Final % NCO | Visc. @ 25° C., mPa·s | Reaction Time, hr |
|---|---|---|---|---|---|---|---|---|---|---|
| 16 | 42.0 TDI<br>200.0 MDI-1<br>8.9 Alcohol A | 280<br>100 | Cat. A<br>Cat. B | 200 | 28.6 | 25 | MDI-3 | 28.7 | 80 | 4.5 |
| 17 | 32.2 TDI<br>200.0 MDI-1<br>10.3 Alcohol A | 280<br>100 | Cat. A<br>Cat. B | 200 | 26.7 | 50 | MDI-2 | 27.8 | 114 | 2.0 |
| 18 | 32.2 TDI<br>200.0 MDI-1<br>10.3 Alcohol A | 280<br>100 | Cat. A<br>Cat. B | 200 | 26.7 | 50 | MDI-3 | 27.2 | 184 | 2.0 |
| 19 | 30.0 TDI<br>200.0 MDI<br>12.8 Alcohol A | 280<br>100 | Cat. A<br>Cat. B | 200 | 25.4 | 50 | MDI-2 | 26.8 | 364 | 3.0 |

The following materials were used in the working examples demonstrating the stable, liquid prepolymers of the partially trimerized and allophanized products above, and a process for their production.

XB: 1,3 butanediol

Polyol A: a propylene glycol/propylene oxide adduct having a molecular weight of about 1000 and an OH number of about 112.

Polyol B: A propylene glycol/propylene oxide adduct having a molecular weight of about 2000 and an OH number of about 56.

Polyol C: A propylene glycol/propylene oxide/ethylene oxide adduct terminated with 20% by weight of ethylene oxide and having a molecular weight of about 4000 and an OH number of about 28.

Polyol D: A glycerine/propylene oxide/ethylene oxide adduct terminated with 17% by weight ethylene oxide having a molecular weight of about 4800 and an OH number of about 35.

Polyol E: a propylene glycol/propylene oxide adduct having a molecular weight of about 4000 and a functionality of about 2.

Iso A: partially trimerized/allophanized polyisocyanate of Example 1.

Iso B: partially trimerized/allophanized polyisocyanate of Example 10.

Iso C: partially trimerized/allophanized polyisocyanate of Example 15.

Examples 20-30

The following procedure was followed using the reaction mixtures as listed in Table 4 below. The amount of the ISO specified in Table 4 was charged to a stirred reactor and the amount of the Hydroxyl Compound specified in Table 4 was added. The reaction mixture was held at 65° C. for 2 hours and then cooled to 25° C. Clear liquid prepolymers were produced that had the NCO content and viscosity at 25° C. as specified in Table 4.

TABLE 4

Stable Liquid Prepolymers of the Partially Trimerized and Allophanized Polyisocyanates

| Example # | ISO | PBW Iso | Hydroxyl Compound | PBW Hydroxyl Compound | % NCO | Visc. @ 25° C., mPa·s |
|---|---|---|---|---|---|---|
| 20 | A | 129.0 | A | 20.3 | 22.8 | 833 |
| 21 | A | 127.1 | B | 22.9 | 22.8 | 652 |
| 22 | A | 125.5 | C | 24.5 | 22.8 | 627 |
| 23 | A | 125.9 | D | 24.1 | 22.8 | 704 |
| 24 | A | 145.7 | XB | 6.1 | 22.8 | 7726 |
| 25 | B | 128.7 | A | 21.3 | 21.2 | 4366 |
| 26 | B | 125.8 | B | 24.2 | 21.4 | 2523 |
| 27 | B | 124.0 | C/XB | 26.0/1.6 | 21.3 | 2235 |
| 28 | B | 124.6 | D/XB | 25.4/1.6 | 20.1 | 6668 |
| 29 | B | 124.0 | E/XB | 26.0/1.6 | 20.1 | 7749 |
| 30 | C | 128.2 | A | 21.8 | 20.4 | 1858 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of a storage-stable, liquid, partially trimerized and allophanized polyisocyanate composition containing isocyanurate groups and having an NCO group content of about 15 to about 41% by weight, comprising:

(1) partially trimerizing and allophanizing:
   (A) from 5 to 85% by weight of toluene diisocyanate having an isomer distribution of:
      (1) from 60 to 100% by weight of the 2,4-isomer, and
      (2) from 0 to 40% by weight of the 2,6-isomer, with the sum of the %'s by weight of (A)(1) and (A)(2) totaling 100% by weight of (A);
   and
   (B) from 5 to 85% by weight of a polyisocyanate of the diphenylmethane series comprising:
      (1) from 0 to 50% by weight of polyisocyanates of the diphenylmethane series having an isocyanate functionality greater than 2,
      (2) from 40 to 100% by weight of 4,4'-diphenylmethane diisocyanate, (3) from 0 to 20% by weight of 2,4'-diphenylmethane diisocyanate, and
(4) from 0 to 6% by weight of 2,2'-diphenylmethane diisocyanate,
with the sum of the %'s by weight of (B)(1), (B)(2), (B)(3) and (B)(4) totaling 100% by weight of (B); and
(C) from 0.1 to 10% by weight of an organic compound or mixture thereof containing from 1 to 4 hydroxyl groups capable of reacting with NCO groups and having a molecular weight of from 32 to 6000;
wherein the sum of the %'s by weight of (A), (B) and (C) total 100% by weight,
in the presence of:
(D) at least one trimerization catalyst and optionally at least one allophanation catalyst,
followed by addition of:
(E) an acidic stopper.

2. The process of claim 1, wherein the storage-stable, liquid, partially trimerized and allophanized polyisocyanate composition has an NCO group content of about 17 to about 39% by weight, and comprises:
(A) from 10 to 80% by weight of toluene diisocyanate having an isomer distribution of:
(1) from 60 to 100% by weight of the 2,4-isomer, and
(2) from 0 to 40% by weight of the 2,6-isomer, with the sum of the %'s by weight of (A)(1) and (A)(2) totaling 100% by weight of (A);
and
(B) from 10 to 80% by weight of a polyisocyanate of the diphenylmethane series comprising:
(1) from 0 to 50% by weight of polyisocyanates of the diphenylmethane series having an isocyanate functionality greater than 2,
(2) from 40 to 100% by weight of 4,4'-diphenylmethane diisocyanate,
(3) from 0 to 20% by weight of 2,4'-diphenylmethane diisocyanate,
and
(4) from 0 to 6% by weight of 2,2'-diphenylmethane diisocyanate,
with the sum of the %'s by weight of (B)(1), (B)(2), (B)(3) and (B)(4) totaling 100% by weight of (B); and
(C) from 0.1 to 10% by weight of an organic compound or mixture thereof containing from 1 to 4 hydroxyl groups capable of reacting with NCO groups and having a molecular weight of from 32 to 6000
wherein the sum of the %'s by weight of (A), (B) and (C) total 100% by weight.

3. A process according to claim 1, wherein (C) is an aliphatic alcohol having from 1 to 36 carbon atoms or an aromatic alcohol having from 5 to 20 carbon atoms.

4. A process according to claim 3, wherein (C) is chosen from at least one of methanol, ethanol, 1,2-ethanediol, 1-propanol, 2-propanol, 1-butanol, isobutyl alcohol 2-butanol, n-amyl alcohol, sec-amyl alcohol, tert-amyl alcohol, 1-ethyl-1-propanol, n-hexanol and isomers thereof, n-octyl alcohol, 2-octyl alcohol, 2-ethyl-1-hexanol, n-decyl alcohol, n-dodecyl alcohol, neopentylglycol, n-tetradecyl alcohol, n-hexadecyl alcohol, n-octadecyl alcohol, 1,2and 1,3-propanediol, 1,4-butanediol, 1,3-butanediol, 2,3-butanediol, 3-methyl-2-butanol, 3,3-dimethyl-1-butanol, 2-ethyl-1,3-hexanediol, glycerol, 1,2,4-butanetriol, pentaerythritol, diethylene glycol, dipropylene glycol, diethylene glycol, triethylene glycol and phenol.

5. A process according to claim 4, wherein (C) is isobutyl alcohol.

6. A process for preparing a storage-stable, liquid, partially trimerized and allophanized polyisocyanate composition containing isocyanurate groups and having an NCO group content of about 15 to about 41% by weight, comprising:
(1) partially trimerizing and allophanizing:
(A) from 5 to 85% by weight of toluene diisocyanate having an isomer distribution of:
(1) from 60 to 100% by weight of the 2,4-isomer, and
(2) from 0 to 40% by weight of the 2,6-isomer, with the sum of the %'s by weight of (A)(1) and (A)(2) totaling 100% by weight of (A);
and
(B) from 5 to 85% by weight of a polyisocyanate of the diphenylmethane series comprising:
(1) from 0 to 50% by weight of polyisocyanates of the diphenylmethane series having an isocyanate functionality greater than 2,
(2) from 40 to 100% by weight of 4,4'-diphenylmethane diisocyanate,
(3) from 0 to 20% by weight of 2,4'-diphenylmethane diisocyanate,
and
(4) from 0 to 6% by weight of 2,2'-diphenylmethane diisocyanate,
with the sum of the %'s by weight of (B)(1), (B)(2), (B)(3) and (B)(4) totaling 100% by weight of (B); and
(C) from 0.1 to 10% by weight of an organic compound or mixture thereof containing from 1 to 4 hydroxyl groups capable of reacting with NCO groups and having a molecular weight of from 32 to 6000;
wherein the sum of the %'s by weight of (A), (B) and (C) total 100% by weight
in the presence of:
(D) at least one trimerization catalyst and optionally at least one allophanation catalyst,
followed by addition of:
(E) an acidic stopper; and
(2) blending
(F) a polyisocyanate of the diphenylmethane series comprising:
(1) from 0 to 50% by weight, based on total weight of (F), of polyisocyanates of the diphenylmethane series having an isocyanate functionality greater than 2,
(2) from 30 to 60% by weight, based on total weight of (F), of 4,4'-MDI,
(3) from 3 to 60% by weight, based on total weight of (F), of 2,4'-MDI; and
(4) from 0 to 6% by weight, based on total weight of (F), of 2,2'-MDI; or
(G) a uretonimine modified polyisocyanate of the diphenylmethane series comprising:
(1) from 34 to 100% by weight, based on total weight of (G), of 4,4'-MDI,
(2) from 0 to 60% by weight, based on total weight of (G), of 2,4'-MDI, and
(3) from 0 to 6% by weight, based on total weight of (G), of 2,2'-MDI

* * * * *